(12) United States Patent
Shen et al.

(10) Patent No.: US 7,618,736 B2
(45) Date of Patent: Nov. 17, 2009

(54) STACKED-TYPE LITHIUM-ION RECHARGEABLE BATTERY

(75) Inventors: Xi Shen, Shanghai (CN); Chuanfu Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 221 days.

(21) Appl. No.: 10/770,630

(22) Filed: Feb. 2, 2004

(65) Prior Publication Data

US 2004/0258986 A1 Dec. 23, 2004

Related U.S. Application Data (60) Provisional application No. 60/484,217, filed on Jun. 30, 2003.

(30) Foreign Application Priority Data

Jun. 23, 2003 (CN) ................................. 03 1 39607

(51) Int. Cl.
*H01M 2/02* (2006.01)
*H01M 2/34* (2006.01)

(52) U.S. Cl. ........................... 429/61; 429/66; 429/161; 429/176; 429/211

(58) Field of Classification Search ................... 429/61, 429/62, 66, 137, 160, 161, 162, 163, 176, 429/211, 231.3, 223, 224
See application file for complete search history.

(56) References Cited

U.S. PATENT DOCUMENTS 2,631,180 A * 3/1953 Robinson .................... 429/137
4,646,430 A * 3/1987 Clarke ..................... 429/161 X
4,879,187 A * 11/1989 Biegger ................... 429/161 X
5,667,909 A * 9/1997 Rodriguez et al. ....... 429/161 X
6,232,015 B1 * 5/2001 Wyser ......................... 429/176
6,248,472 B1 * 6/2001 Kelemen ..................... 429/163
6,379,840 B2 * 4/2002 Kitoh et al. .................. 429/211
6,426,164 B1 * 7/2002 Yamaura et al. ......... 429/223 X
6,844,109 B2 * 1/2005 Xing et al. .............. 429/162 X
7,029,789 B2 * 4/2006 Kaneta .................... 429/176 X
2003/0124416 A1 * 7/2003 Kaneta ......................... 429/66

FOREIGN PATENT DOCUMENTS

| CN | 1097830 C | 2/1997 |
|---|---|---|
| CN | 1243606 A | 5/1999 |
| CN | 1261728 A | 8/2000 |
| CN | 2514496 Y | 10/2002 |

\* cited by examiner

*Primary Examiner*—Stephen J. Kalafut
(74) *Attorney, Agent, or Firm*—Venture Pacific Law, PC (57) ABSTRACT

A stacked lithium-ion rechargeable battery comprises a plurality of stacked positive and negative electrode couples forming a battery core, each of said couple having a negative electrode, a positive electrode, a separator, and non-aqueous electrolyte, all encased in a battery case. The core is secured by a clamp case and said clamp case is encased in a battery shell. There are thin neck parts (or conducting tabs) extending from the base plates of the positive and negative electrodes to form the current collectors of the positive and negative electrodes. The positive electrodes and negative electrodes are arranged such that the two current collectors are located on the two opposite ends of the core. The current collector at each end of the core is clamped by a clip and connecting to the respective positive and negative terminals. This stacked lithium-ion rechargeable battery has a relatively low impedance, high discharge rate and high safety performance. The reusable rate of this battery is high after the battery short-circuits.

22 Claims, 5 Drawing Sheets

STACKED-TYPE LITHIUM-ION RECHARGEABLE BATTERY

CROSS REFERENCE

This application claims priority from a provisional patent application entitled "A Stacked-Type Lithium-ion Rechargeable Battery" filed on Jun. 30, 2003, having a Provisional Patent Application No. 60/484,217; and a Chinese patent application entitled "A Stacked-Type Lithium-ion Rechargeable Battery" filed on Jun. 23, 2003, having a Chinese Application No. 03139607.0. These applications are incorporated herein by reference.

FIELD OF INVENTION

The present invention relates to lithium-ion rechargeable batteries, and, in particular, high capacity and highly safe, stacked, lithium-ion rechargeable batteries.

BACKGROUND

In recent years, with the extensive application of a variety of portable electronic products, lithium-ion rechargeable battery, due to its superior characteristics such as high voltage, high capacity, low voltage loss, and zero-memory-effect, has been widely used in a variety of applications. However, if short-circuiting occurs within the battery, the internal current rises, the internal pressure rises, and the battery may explode or ignite and burn.

Chinese patent, Number 96197204.1, discloses a type of battery that uses a PTC component. In normal charge state, the resistance of the PTC component is comparatively small. In short-circuit state, the current through the component is large and the temperature rises sharply within a short period of time. When the temperature reaches to a certain degree, the resistance of the PTC component goes up suddenly, and the circuit approaches a short-circuit state. When the temperature falls, the PTC component returns to its low-resistance state, and the circuit conducts once again. By using the PTC component, the battery circuit may break during the short-circuit state, and survive such short-circuit state many times.

Chinese patent, Number 98801710.5, discloses an explosion-proof rechargeable battery that uses non-aqueous electrolyte. The internal circuit of the battery can be safely and reliably switch-off when the battery reaches an over-charged state, and the battery uses a circuit-breaker for high temperature state. The structure of the battery is to provide at the seal electrically and mechanically connected upper and lower plates (1, 2). When the internal pressure of the battery exceeds the regulating state, the mechanical connection of the plates (1, 2) breaks and thereby cuts off the electrical connection. Furthermore, the mechanical breaking pressure of the plates decreases in accordance with the increase in the battery volume ratio.

Chinese patent, Number 99121937.6, discloses a safety device for rechargeable batteries. Its characteristic is that at the top opening of the battery case which contains the electrodes and fluid electrolytes there is a sealed gasket below which are electrode plates that are stacked from the bottom to the top. Between the electrode plate and the top cover is a circuit-cutoff component. This circuit-cutoff component breaks when the electrode plates expand and exert pressure on the circuit-cutoff component, and the circuit-cutoff component breaks and cut off the circuit, ensuring the battery against the abnormal activity or explosion.

Chinese patent, Number 01252383.6, discloses a type of explosion-proof lithium-ion battery, providing on the cover of the battery an explosion-proof safety valve. When the battery short-circuits, the internal energy rapidly releases and the internal pressure increases. When the internal pressure reaches the limit of the explosion-proof safety valve, the valve opens to release the buildup of the high pressure gases and reduces the pressure in the battery, thereby preventing the battery from exploding.

Although the above-mentioned public and patented technologies may improve battery safety performance to a certain extent, there exist certain disadvantages as well. Generally speaking, the structure is complex, the cost is high, and the battery or battery packs occupy large amount of space, affecting overall battery capacity. Furthermore, when the battery short-circuits, although safety measures are taken, the short-circuited battery is damaged in the process and cannot be used again.

Moreover, in the above-mentioned public and patented technologies, the electrode group usually is consist of the positive electrode plates, the insulator, the negative electrode plates, all stacked and wound to form the electrode core. The core may be manufactured in cylindrical or square shapes to form the lithium-ion rechargeable battery, typically of low capacity. However, for battery-driven electric vehicles, battery-driven electric bicycles, communication switches, aerospace and aircraft power sources and large-capacity units for industrial and household applications, these power sources normally consist of several high capacity batteries connected in series to form battery groups. For these types of high capacity batteries, a high level of safety performance is required. If a winding structure is used, the length of the electrode plate may reach over ten meters or multiples thereof and the winding becomes extremely difficult. Moreover, this structure has a rather small heat dissipation area, not conducive for internal heat dissipation, affecting the high discharge rate of the battery. Therefore, for large current and large discharge applications, the winding structure is not suitable.

When compared with other types of rechargeable battery, lithium-ion battery has high internal resistance. When the battery is in a high discharge state, the voltage falls sharply, the discharge time shortens considerably, and the battery capacity is greatly reduced. The low conduction characteristic of the normal electrode is one of the primary reasons why lithium-ion battery has high internal resistance. At present, most commercial lithium-ion batteries use one or more conducting tabs (also called current collector) as the conductor for current flow. But such current flow is limited to a few welding-spots, resulting in low conductibility and uneven current flow in the charge/discharge process. Thus, such conducting tabs are not suitable for batteries wanting high capacity, high discharge, and high performing recharge cycle characteristics.

More importantly, in the design of high capacity batteries, such as for use as motor-power batteries, its safety performance is a primary factor to consider. For common lithium-ion rechargeable batteries, the conducting tabs are welded to the positive and negative electrode covers. When the battery is dropped or severely shaken, the core can easily move, causing the positive and the negative plates to move from its positions and the internal circuit to break. At the same time, the force bearing parts typically are at the welding spots of the conducting tabs, which can easily cause the welding-spots to fall off, thereby causing a series of safety problems.

Given the concerns over prior art battery designs, it is therefore desirable to provide novel designs avoiding prior art issues.

SUMMARY

An object of the present invention is to provide improved safety performance for rechargeable battery technologies.

Another object of the present invention is to provide improved positive and negative electrode conducting tab structures for rechargeable battery.

Briefly, A stacked-type lithium-ion rechargeable battery, comprising (1) a battery core comprising a stack of a plurality of positive and negative electrode couples, where of each of said couples comprising: (a) a separator; (b) a negative electrode having a first metal plate having thereon lithium-ion active substances, wherein said first metal plate having a main body portion and a thin elongated part extending from said main body portion; (c) a positive electrode having a second metal plate having thereon lithium-ion active substances, wherein said second metal plate having a main body portion and a conducting tab extending from said main body portion; wherein said separator enveloping one of said positive or negative electrode; and wherein said positive electrode being stacked reversely to said negative electrode such that said elongate part of said positive electrode and said elongated part of said negative electrode are at opposite ends; (d) a first clip clamping the thin elongated parts of said positive electrodes to form a positive current collector, said first clip connecting to a positive terminal; (e) a second clip clamping the thin elongated parts of said negative electrodes to form a negative current collector, said second clip connecting to a negative terminal; and (f) electrolyte; and (2) a case securing said battery core.

The advantages of this stacked type lithium-ion rechargeable battery invention are as follows:

1) Battery impedance is a relatively low, excellent high rate of discharge, low temperature-rise during large current discharge, and good safety performance; and Battery of such structure is suitable for high capacity, high power applications, especially as the primary power source for automobiles;

2) During the short-circuit state, the structure of the current collector may prevent current from rising, thereby greatly improve the safety performance; and 3) After battery short-circuited, the battery may continue to be use without significant change to the capacity of the battery.

DETAILED DESCRIPTIONS OF THE PREFERRED EMBODIMENTS

Embodiments for a stacked-type lithium-ion rechargeable battery are disclosed, said battery embodiments generally having negative electrodes made of metal plates coated with lithium-ion active substances, positive electrodes made of metal plates coated with lithium-ion active substances, separators, and non-aqueous electrolyte, all of which enclosed in a battery case. A positive electrode, a separator, and a negative electrode form an electrode couple. Several electrode couples are stacked to form the battery core where the battery core is clamped and encased in the battery case.

The metal plates of the positive and negative electrodes each has a main body portion and a thin elongated part (also referred to as a conducting tab) extending from the main body portion of the metal plates of the positive and negative electrodes. The conducting tabs collectively form the positive and negative current collectors, where the positive and negative current collectors are at opposite ends of the core.

Each ends of the core having a current-collector structure, each of which comprises a connector, a clip and a connecting plate. The clip firmly clamps along the side of the conducting tabs and the side of the connector, and through the connecting plate conduct with the core.

The clamp case is a box-type structure with opened upper and lower ends, using a screw on the side to tighten the core. The clamp case is improved by having extruding parts on the two ends. The length of the extruding parts plus the height of the clamp case equals the battery length minus the thickness of the upper and lower covers. The clamp case can be further improved by using stainless steel, copper, or aluminum material, struck with concave imprints on the outer side.

The separator is improved by using a bag-type separator opened on one side, where at least one of the electrodes is inserted in the bag-type separator to form the stacked-type core.

The current collectors of the positive and negative electrodes, connectors, clips and connecting plates are connected to each other by one or more screws, one or more rivets, one or more welded screws, or one or more welded rivets to form as one unit.

The above-described connecting plates are further improved by using multiple layers of metal foils to form flexible connecting plates.

In each of the conducting tabs of the positive and/or negative electrodes, there is an area A having a relatively larger resistance. When the current collectors of the positive and negative electrodes experience a relatively higher current during the short-circuit state, the higher resistance in this area causes this area to overheat and break or causes a lower current to pass through the positive and negative electrode couple.

The cross section of area A should be smaller than the cross sections of the other areas of the current collector. The cross section of area A may be reduced by using notches.

Area A can be coated with a chemical substance so that such coat can during high temperature react with the current collector to increase the resistance of area A.

The chemical substance described above can be $MnO_2$, $Co_2O_3$, $Co_3O_4$ and $LiCO_3$, $Co(NO_3)_2$, $Ni(NO_3)_2$, $NiNO_2$, $Cr_2O_3$, $Li_2MnO_4$, $LiCrO_4$, $Li_2FeO_4$, $Mn_2(SO4)_3$, $LiNoO_3$, phenol, lithium oxalate, benzoquinone, hexanedione, phthalic anhydride, oxalic anhydride, pyridic oxide, 8-hydrox-quinoline, hexamethylenetetramine, aniline, o-nitroaniline, p-nitroaniline, or one or more types of p-nitrophenol.

The above-described area A may be covered with high temperature resistant adhesive sheet in order to minimize heat dissipation in that area.

In the current collectors of the positive and negative electrodes, there is a PTC Area B. When there is high temperature generated during the short-circuit state, the current collectors of the positive and negative electrodes increase the resistance in this Area to reduce the current. After temperature is reduced, the current collector may continue to function.

In the above-described stacked-type lithium-ion rechargeable battery, the other components are further improved as follows:

The cathode includes an active substance comprising of a complex-layered oxide of lithium and a transitional metal, which may have a reverse reaction with lithium-ion. Examples of these active substances include: the complex layered oxides of lithium and transitional metals of $Li_xNi_{1-y}Co_yO_2$ (wherein $0.9<=x<=1.1$, $0<=y<=1.0$), and $Li_xMn_{2-y}B_yO_2$ (among them, B is the transitional metal, $0.9<=x<=1.1$, $0<=y<=1.0$).

The anode comprises an active substance that contains graphitized carbon series materials which can repeatedly absorb and release lithium-ions. Examples of such active substance materials includes: natural graphite, man-made graphite, middle-phased carbon tiny ball, mesocarbon microbeads and middle-phased carbon fiber.

The electrolyte solution, stated above, contains lithium-salt chain esters and cyclic esters mixture. Among them, lithium-salts include: lithium perchlorate, lithium hexafluorophosphorate, lithium tetrafluoroborate, lithium chloroaluminate, lithium halide, one of lithium fluorohydroxyl and oxyfluorophosphorate or their mixture; chain esters contain dimethyl-carbonate, diethyl-carbonate, ethyl methyl carbonate, ethyl propyl carbonate, diphenyl carbonate, methyl acetate, ethyl acetate, ethyl acrylate, di-methoxyethane, diethoxyethane and one of other chain organic ester containing fluorine, sulfur or unsaturated bond or their mixture; circular esters contain ethylene carbonate, propylene carbonate, ethylidene-carbonate, γ-butyrolactone, sultone and one of other circular organic esters containing fluorine, sulfur or unsaturated bond or their mixture.

Embodiments

A detailed description of the present invention of the stacked-type lithium-ion rechargeable battery is provided below:

First Embodiment

The call-outs are described as follows:

| 1 | stacked-type electrode core | 2 | clamp case |
| 3 | battery case (shell) | 4, 4' | connecting plate |
| 5, 5' | connector | 6, 6' | clip |
| 7, 7' | insulation ring | 8, 8' | battery end cover |
| 9 | bag-type separator | 10 | electrode plate (sheet) |
| 11 | current collector | 12 | extruding part |
| 13, 13' | terminal | | |

Figure 1:
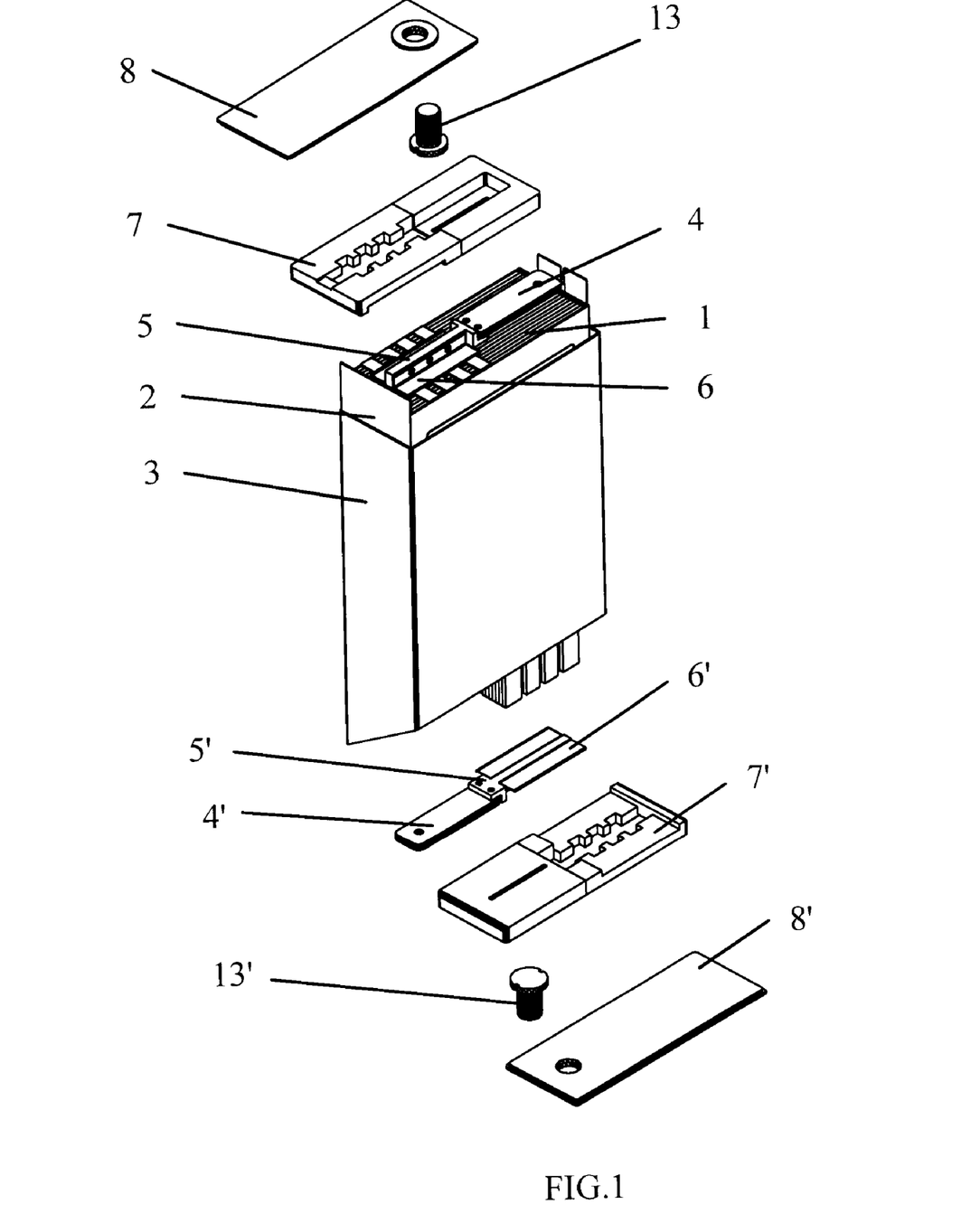
FIG. 1 is an illustration of a structure of the stacked-type lithium-ion rechargeable battery.

Referring to FIG. 1, this invention of stacked-type lithium ion rechargeable battery contains a stacked-type electrode core 1, a clamp case 2, a case 3, connecting plates 4, 4' on each ends, connectors 5, 5' on each ends, clips 6, 6' on each ends, insulation rings 7, 7' on each ends, top covers 8, 8' on each ends, terminals 13, 13' on each ends.

Figure 2:
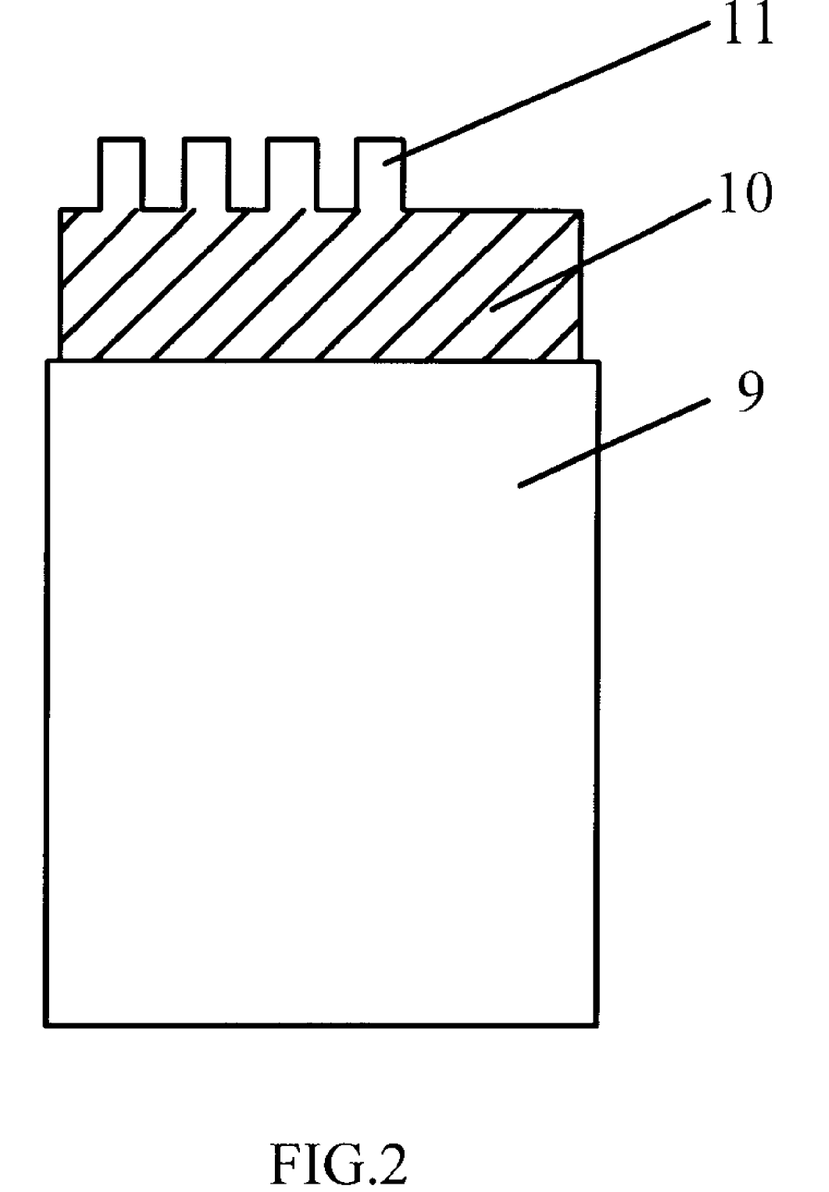
FIG. 2 is a side view of the electrodes of the stacked-type lithium-ion rechargeable battery.

Referring to FIG. 2, this invention of stacked-type lithium ion rechargeable battery uses a bag-type separator 9 to form the stacked-type electrode core 1, and inserting one of the positive and negative electrode plates 10 into the bag-type separator 9 and stacked. This method can divide the long electrode plate into several smaller pieces, reducing battery assembling difficulties. The bag-type separator 9 is formed by using high temperature to melt the sides of the separator leaving one side open to form the bag. The electrode plate 10 is inserted from the open side, the current collector 11 is exposed to the outside, the other sides of the bag-type separator 9 is firmly sealed, completely separates the positive and negative electrode plates 10. Accordingly, the advantages of the bag-type separator 9 are: (1) ease to manufacture; (2) effectively prevent the battery from internal short-circuiting, thereby improving the safety performance. Additionally, the rectangular-shaped, stacked-type structure increases the heat dissipation area, in favor of increasing the high discharge rate characteristic of the battery.

Figure 3:
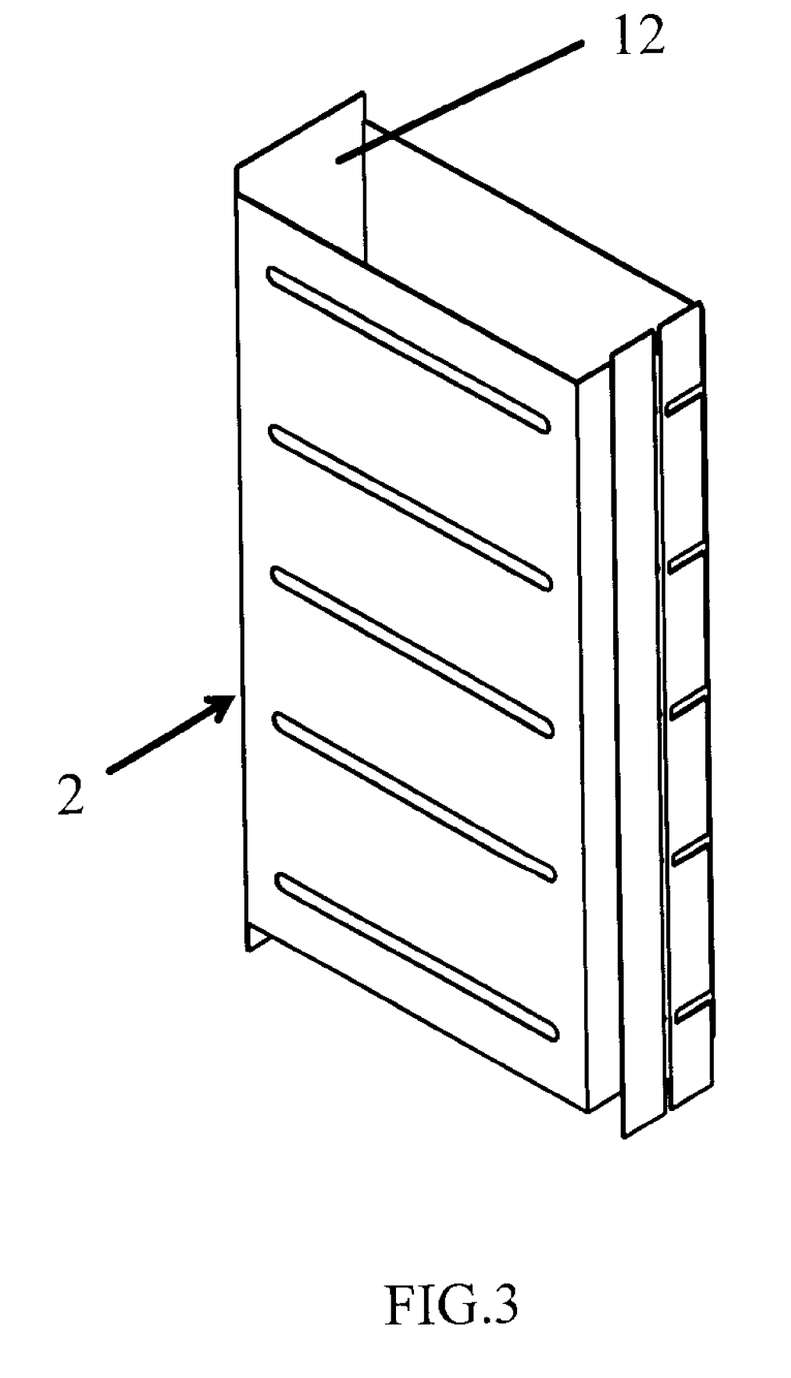
FIG. 3 is an angle view of the clamp of the stacked-type lithium-ion rechargeable battery.

Referring to FIG. 3, the clamp case 2 is a box-type structure with open upper and lower ends, used to clamping the stacked core. The clamp case 2 is made of stainless steel plate, copper plate or aluminum plate material, struck with concave imprints on the outer side, using one or more screws on one side to tighten the core. In this manner, the core is effectively protected from movement, preventing the positive and negative electrodes from short-circuiting if the battery is dropped or undergoes severe vibration. Furthermore, the single-side secured box-type effectively utilizes the internal space of the battery, conveniently maximizing the capacity of the battery. The two sides of the clamp case all have extruding part 12. In assembling the battery (referring to FIG. 4), when the upper and lower covers 8, 8' welded to the battery's case 3, the extruding parts 12 of the two ends are butting against the two sides of the top cover 8, 8', such that the core cannot move, and the outer side of the clamp case and the inner side of the battery case closely attached to form a secured battery having a firm core.

The connecting plates 4, 4' are flexible connecting plates formed by overlapping layers of metal foils; their conducting performance and flexibility all better than those by other methods. When the battery of this structure is used in a high vibration environment, any external force applied to the battery's current-collecting structure is effectively dispersed. The connecting points on the connecting plates are hardly affected by external forces and they do not easily come lose, greatly improves the safety performance of the battery.

In this invention, the positive and negative current collectors on the two ends of the stacked-type lithium ion rechargeable battery are clamped firmly along the stacked direction onto the sides of the connectors 5, 5' using the clips 6, 6', and it is connected via welded screw or welded rivet to form the current-collecting structure. The connector 5, 5' are a T-type structure composed of aluminum or copper material, such structure dictated that the side receiving forces not be affected by the positive and negative current collector. Furthermore, the technology is simple, assuring even current distribution during charge or discharge, and effectively eliminating contact resistance thereby decreasing internal battery resistance.

The preparation process for the positive electrode plate of this stacked-type lithium ion rechargeable battery is that: PVDF is dissolved in NMP, and $LiCoO_2$ and acetylene black are added into such solution, and mixed adequately into a thick paste, which is composed of $LiCoO_2$; acetylene black; PVDF=92:4:4. The paste is evenly smeared on the two sides of a 20 um aluminum foil, and then desiccated for three hours at 120° C. After pressed and extended, the positive electrode plate has an area 220×120 mm$^2$ and a thickness 160 um. The paste layer on the terminal side of the positive electrode plate is removed to expose the aluminum foils with a width of 20 mm.

The preparation process of the negative electrode plate of this stacked-type lithium ion rechargeable battery is that: PVDF is dissolved in NMP, man-made graphite is added to such solution, and mixed adequately to make paste, which is composed of man-made graphite: PVDF=95:5. The paste is evenly smeared on the two sides of a 20 um copper foil, and then desiccated for three hours at 120° C. After pressed and extended, the negative electrode plate has an area 220×120 mm² and a thickness of 160 um. The paste layer on the terminal side of the negative electrode plate is removed to expose 20 mm of the copper foil.

Figure 4:
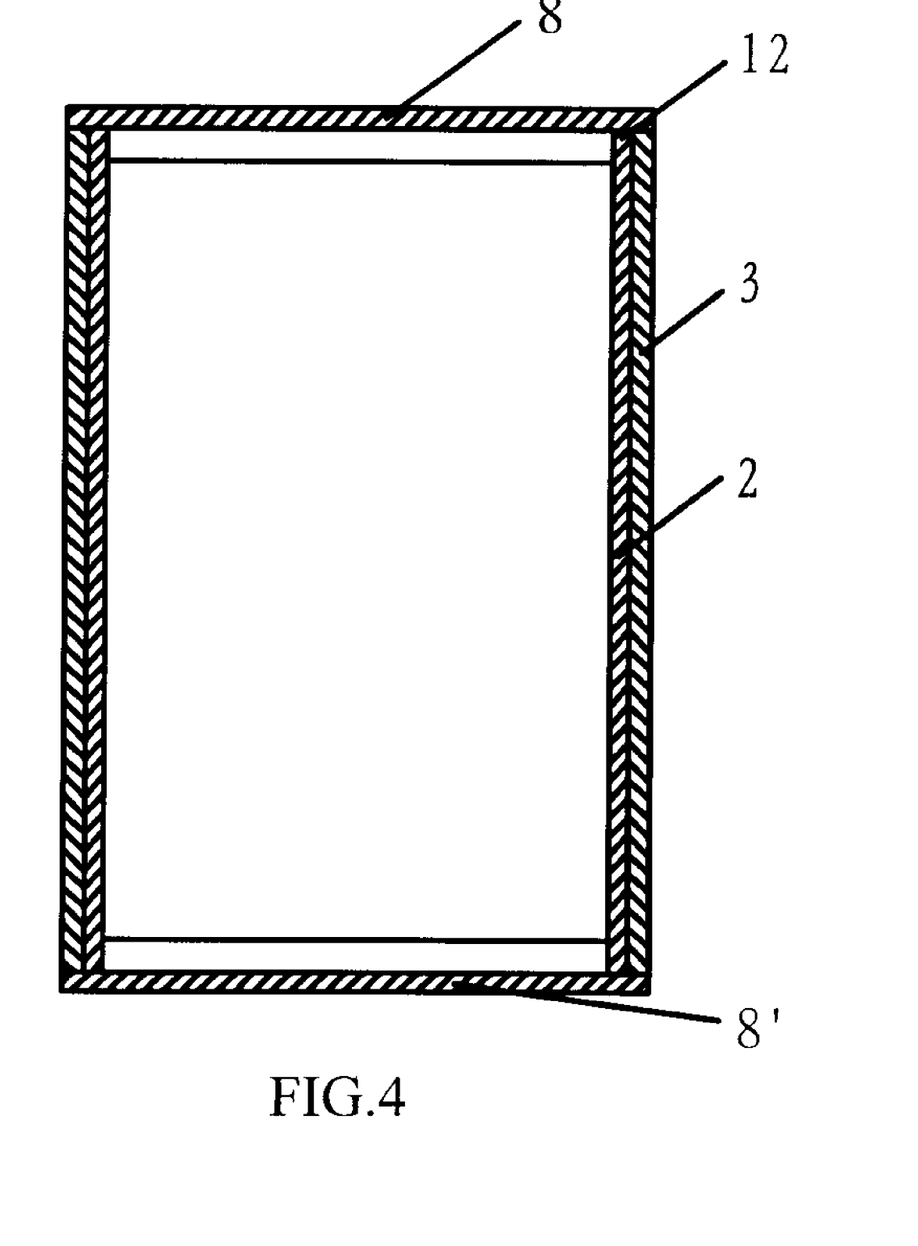
FIG. 4 is an illustration of the core, the shell, and the top cover of the stacked-type lithium-ion rechargeable battery.

The assembling method of this stacked type lithium ion rechargeable battery is that the positive and negative electrode plates are inserted respectively in the bag-type separator which is 40 um thick and is made of micro-porous polypropylene materials, stacked neatly, and clamped closely through clamp case 2 to obtain the stacked electrode core. The two ends of this core expose respectively the aluminum foil and the copper foil on the positive and negative electrode current connectors. On the stacked direction of electrode plate, the positive and negative current connectors are clamped firmly with screws or clips on the upper and the lower connectors, to form current collecting structure of the positive and negative electrodes. The core is set in the shell, the two ends are installed with connecting plates 4, 4', the insulation ring 7, 7', and the cover 8, 8'. Then, the cover is welded on the top of the shell. The outer side of the core and the inner side of the shell are closely attached, and the extruding parts on the two ends of the clamp on the core are butting on the two sides of the cover. When battery is completely assembled, $LiPF_6$ in 1 mol/cm³ concentration is dissolved in EC/DEC=1:1 mixing solution and injected in the battery shell and sealed, producing a 100 Ah square-stacked-lithium-ion energized-battery.

Battery Characteristic Test

Discharge Performance

The square lithium ion energized-battery produced from the above-described method is charged with a 20 A constant current to 4.1V. After the voltage rises to 4.1V, the battery is charged by constant current and is cut off at 0.5 A. Then, the battery is discharged again by 20 A constant current, cut off when the voltage is at 3.0V, testing the initial capacity and the impedance.

Load Performance

The square lithium ion energized battery is charged using a 20 A constant current to 4.1V. After the voltage rises to 4.1V, the battery is charged by constant voltage with cut off current at 0.5 A. Then, the battery is discharged at 100 A constant current and cut off when the voltage is at 3.0V. The maintenance rate of the capacity at high load and the extent of the temperature change during discharge are tested.

Safety Performance

Drop Test. The square lithium ion energized battery is charged by a 20 A constant current to 4.1V. After the voltage rises to 4.1V, the battery is charged by constant voltage and cut off when the current is at 0.5 A. The impedance and the voltage are tested before the drop. Then, holding one side of the battery facing the ground, the battery is dropped from a height of 1 meter to a clay surface. Then, each of the six sides of the battery is held and dropped, thereby constituting a cycle. After each drop cycle, the impedance and voltage are measured. At the same time, the battery is examined for leakage, heat, smoke, and explosion. Three cycles are conducted successively.

The results of the test above are showed on table 1.

TABLE 1

| | Embodiment One |
|---|---|
| Structure type | Square stacked |
| Initial discharge capacity (Ah) | 102 |
| Impedance (mΩ) | 2.3 |
| 100 A/20 A discharge capacity maintenance rate (%) | 93.2 |
| Temperature rise at 100 A discharge (° C.) | 1.5 |
| Impedance and voltage change before and after the drop-off | None |
| Leakage, heat, smoke and explosion before and after the drop-off | None |

Embodiment 2

Explanation of the call-outs of the attached drawing:

| 14 | electrode plate | 15 | current collector |
|---|---|---|---|
| 16 | area A | 17 | high-temperature-proof adhesive layer |

Figure 5:
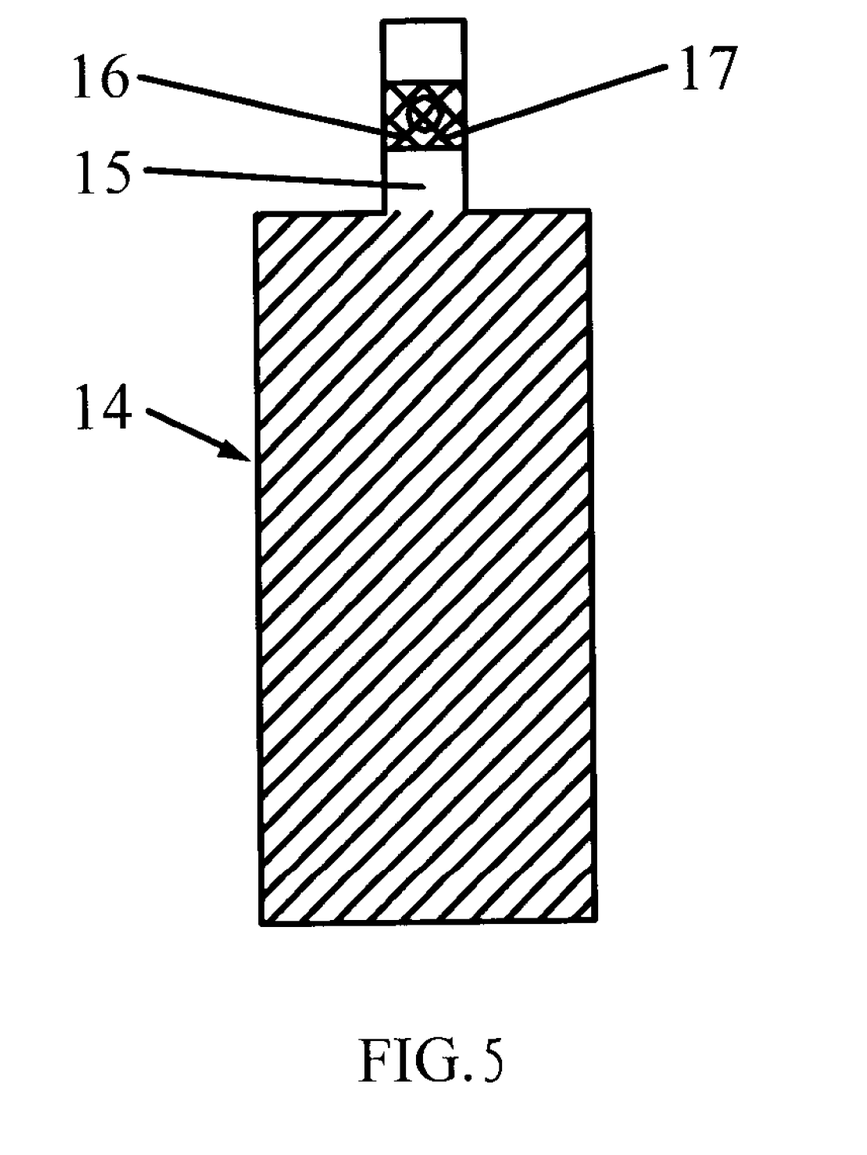
FIG. 5 is an illustration of area A of the stacked-type lithium-ion rechargeable battery.

This invention regarding stacked-type lithium-ion rechargeable battery is elaborated as follows:

As illustrated in FIG. 5, electrode plate 14 includes current collectors 15, and current collector 15 include an Area A indicated at 16. Area A is an area having relatively higher resistance.

In analysis, that internal short-circuiting of the battery first occurs at one or more internal spots. For the stacked-type battery, it is shown that the current rises sharply at one electrode plate. If the current collectors for this plate have an area with relatively higher resistance, it may prevent the current from rising, thereby preventing current on other plates from rising, and thereby improving safety performance of the battery. After the battery short-circuits, the battery can still be used and the capacity of the battery does not change much.

Area A is the comparatively higher resistance area of the current collector 15 and can be implemented in many ways, for example, decreasing the cross sectional area of the current collector, creating a notch in the current collector, creating holes in the current collector, etc.

Placing a high-temperature-proof adhesive layer 17 on the current collectors 15 may prevent the current collectors from heat dissipation and prevent the current collectors near the electrode plates from rising temperature, so that the safety performance of the battery may be greatly improved. Furthermore, the adhesive layer 17 may also increase the strength of current collectors 15.

A chemical substance may be coated on Area A. When the battery short-circuits, the internal temperature rises quickly. When it reaches a certain temperature, the chemical substance reacts with Area A, generating a substance having higher resistance than that of the current collectors. Because the current rises sharply, the current collectors in this place melts rapidly, or, because the resistance increases, the current decreases, either way increasing the safety performance of the battery.

The chemical composition of the chemical substance coat may be an oxidant, as well as an agent that may react with the current collectors at high temperature. This agent should not interfere with normal electrical interaction and should not cause any adverse effect to the battery. The coat may be $Mno_2$, $Co_2O_3$, $CO_3O_4$ and $LiCO_3$, $CO(NO_3)_2$, $NiNO_2$, $Cr_2O_3$, $Li_2MnO_4$, $LiCrO_4$, $Li_2FeO_4$, $Fe_3O_4$, $Mn_2(SO_4)_3$, LiNO3, $MnO_2$, $Co_2O_3$, $Co_3O_4$ and $LiCO_3$, $Co(NO_3)_2$, $Ni(NO_3)_2$, $NiNO_2$, $Cr_2O_3$, $Li_2MnO_4$, $LiCrO_4$, $Li_2FeO_4$, $Fe_3O_4$ $Mn_2(SO4)_3$, $LiNoO_3$, phenol, lithium oxalate, benzoquinone, hexanedione, phthalic anhydride, oxalic anhydride, pyridic oxide, 8-hydrox-quinoline, hexamethylenetetramine, aniline, o-nitroaniline, p-nitroaniline, and one sort or several sorts of p-nitrophenol.

The current collectors include a PTC area, Area B. The PTC connects together the current collectors of the same electrode in the positive and negative electrodes of the core.

When stacked-type lithium ion rechargeable battery short-circuits, the internal temperature goes up sharply and the high temperature causes the resistance of Area B to increase many folds and thereby decreases the current; or the high temperature causes area B to melt and break so as to cut off the connection between this electrode plate and with the other positive and negative electrodes. When the temperature decreases, the connecting tab may reconnect automatically. After the temperature decreases, the current collectors may continue to work. In this manner, it reduces the possibility of leakage, fire and explosion, improving the safety performance of the battery.

Accordingly, the following are particular examples of this invention.

First, the positive electrode plate of the stacked-type lithium ion rechargeable battery is tested.

Embodiment 3

The preparation process of the positive electrode plate of this stacked-type lithium ion rechargeable battery is that: PVDF is dissolved in NMP, $LiCoO_2$ and acetylene black are added in such solution. This solution is thoroughly mixed in to a paste form, which is composed of $LiCoO_2$, acetylene black: PVDF=92:4:4. The paste is evenly smeared on two sides of a 20 um aluminum foil, and then desiccated for three hours at 120° C. After pressed and extended, and scrapping off the paste along the terminal edge of the positive electrode, the positive electrode plate has an area 29 mm×40 mm×0.15 mm and the current collector is 4 mm wide.

The current collector is created with holes near its center, where the diameter of the hole is ϕ1.0 and there are three holes. The current collector is coated with a high-temperature-proof adhesive layer which covers at least all of the holes.

Embodiment 4

Except for having two holes on the current collector, other aspects of this embodiment are the same as embodiment 3.

Embodiment 5

Other than having one hole on the current collector, other aspects of this embodiment are the same as embodiment 3.

Embodiment 6

Other than coating a 0.1 mm of $MnO_2$ on the current collector, other aspects of this embodiment are the same as embodiment 3.

Embodiment 7

Other than coating 0.1 mm of $Co_2O_3$ on the current collector, other aspects of this embodiment are the same as embodiment 3.

Embodiment 8

Other than coating 0.1 mm of $LiCO_3$ on the current collector, other aspects of this embodiment are the same as embodiment 3.

Comparison with Embodiment 1

Other than the current collector does not have holes and is not coated with high-temperature-proof adhesive layer, the other aspects of this embodiment is the same as embodiment 3.

Performance Test

Using a constant voltage of 3.6 v, the current required and time required to cause the fuse to break are shown on table 2.

TABLE 2

|  | Chemical substance coat | Effective width of the current collector (mm) | Current Level in Melting Fuse (A) | Time to Melt Fuse (S) |
| --- | --- | --- | --- | --- |
| Embodiment 3 | none | 1.0 | 2.8 | 1.8 |
| Embodiment 4 | none | 2.0 | 6.5 | 2.0 |
| Embodiment 5 | none | 3.0 | 10.0 | 1.3 |
| Embodiment 6 | $MnO_2$ | 1.0 | 1.3 | 1.9 |
| Embodiment 7 | $Co_2O_3$ | 1.0 | 1.8 | 2.2 |
| Embodiment 8 | $LiCO_3$ | 1.0 | 2.1 | 2.5 |
| Comparison with Embodiment 1 | none | 4.0 | 12.0 | 1.5 |

A stacked-type lithium ion rechargeable battery having 20 layers of positive plates has a capacity of 1600 mAh. When short-circuit current reaches 15 C capacity of the electrode plate, the current collector melts to break the circuit, preventing the current and internal pressure from rising thereby improving the safety performance of the battery and avoiding the battery from becoming unusable.

The following is to test battery performance after producing the batteries from the electrode plates.

Embodiment 9

The preparation process of the positive electrode plate of this stacked-type lithium ion rechargeable battery is the same as embodiment 3.

The preparation process of the negative electrode plate of this stacked-type lithium ion rechargeable battery is that: PVDF is dissolved in NMP, man-made graphite is added to such solution and mixed adequately to make into a paste form, which is composed of man-made graphite: PVDF=95:5. The paste is evenly smeared on the two sides of a 20 um copper foil, and then desiccated for three hours at 120° C. After pressed and extended, the negative electrode plate has a measurement of 30 mm×42 mm×0.15 um and the thickness of the current collector is 4 mm wide.

The assembling method of the stacked-type lithium ion rechargeable battery is like normal assembling method of stacked-type lithium ion rechargeable battery. In stacking the positive plate, the separator, and the negative plate, wherein there are 25 positive plates and 26 negative plates. After the battery is assembled, the electrolyte, comprising of $LiPF_6$ having a concentration level of 1 mol/cm³, is dissolved in the mixing solution of EC/DEC=1:1, and is injected in to the shell. The battery is then sealed, forming the 1600 mAh square-stacked-lithium-ion energized-battery.

Embodiment 10

The preparation process of the positive electrode plate is the same as in embodiment 4, and the other aspects of this embodiment are the same as embodiment 9.

Embodiment 11

The preparation process of the positive electrode plate is the same as embodiment 5, and the other aspects of this embodiment are the same as embodiment 9.

Embodiment 12

The preparation process of the positive electrode plate is the same as embodiment 6, and the other aspects of this embodiment are the same as embodiment 9.

Embodiment 13

The preparation process of the positive electrode plate is the same as embodiment 7, and the other aspects of this embodiment are the same as embodiment 9.

Embodiment 14

The preparation process of the positive electrode plate is the same as embodiment 8, and the other aspects of this embodiment are the same as embodiment 9.

Comparison Embodiment 2

The preparation process of the positive electrode plate is the same as comparison embodiment 1, and the other aspects of this embodiment are the same as embodiment 9.

Performance Test

The external short-circuiting is tested as follows: the battery is charged to 4.2V with cutoff current at 50 mA; and a 5 mΩ resistor is used to connect the positive and negative electrodes to short-circuit the battery. The surface temperature of the battery is recorded and the battery is observed for leakage, fire, and explosion.

The results of the above tests are shown on table 3.

TABLE 3

| | Chemical Coat | Current Collector Effective Width (mm) | Surface Highest Temperature (°C.) | Leakage, Fire, Explosion |
|---|---|---|---|---|
| Embodiment 9 | none | 1.0 | 79 | no |
| Embodiment 10 | none | 2.0 | 87 | no |
| Embodiment 11 | none | 3.0 | 98 | no |
| Embodiment 12 | $MnO_2$ | 1.0 | 63 | no |
| Embodiment 13 | $Co_2O_3$ | 1.0 | 68 | no |
| Embodiment 14 | $LiCO_3$ | 1.0 | 72 | no |
| Comparison Embodiment 2 | none | 4.0 | 110 | no |

The embodiments and the comparison embodiment illustrates that by taking measures with respect to the current collector and by creating an area having relatively higher resistance, the temperature and the pressure can be controlled when the battery short-circuits, thereby decreasing the possibility of leakage, fire, and explosion. This invention of stacked-type lithium ion rechargeable battery may apply to electrically operated automobiles, laptop computers, mobile telephones, electrically operated toys, and so on.

The invention claimed is:

1. A stacked-type lithium-ion rechargeable battery, comprising:
   a battery core comprising a stack of a plurality of positive and negative electrode couples, where of each of said couples comprising:
      a separator;
      a negative electrode having a first metal plate having thereon lithium-ion active substances, wherein said first metal plate having a main body portion and a thin elongated part extending from said main body portion;
      a positive electrode having a second metal plate having thereon lithium-ion active substances, wherein said second metal plate having a main body portion and a conducting tab extending from said main body portion;
   wherein said separator enveloping one of said positive or negative electrode; and wherein said positive electrode being stacked reversely to said negative electrode such that said elongate part of said positive electrode and said elongated part of said negative electrode are at opposite ends;
   a first clip clamping the thin elongated parts of said positive electrodes to form a positive current collector, said first clip connecting to a positive terminal;
   a second clip clamping the thin elongated parts of said negative electrodes to form a negative current collector, said second clip connecting to a negative terminal; and
   electrolyte; and
   a clamp case securing said battery core, wherein said clamp case having a box-type structure with an open upper end and an open bottom end, and said clamp case having two ends and there is an extruding part on each of the ends.

2. The battery as recited in claim 1 wherein said clamp case having said two ends and said extruding parts butting against respective covers on the two ends.

3. The battery as recited in claim 1 wherein said clamp case is made from stainless steel, copper or aluminum, and struck with concave imprints on the outer side.

4. The battery as recited in claim 1 wherein said separator is a bag-type separator having an opening on one side; and one of said positive electrode or said negative electrode of the electrode couple is inserted in said separator.

5. The battery as recited in claim 1 wherein on said conducting tab of the positive and/or negative electrodes, there is an area A having a relatively larger resistance; wherein said area A of said conducting tab breaks during short-circuit state to cause no or lowered current to pass through from the electrode.

6. The battery as recited in claim 5 wherein the cross section of said area A of the conductor tab is smaller than the cross sections of the other areas of the conductor tab.

7. The battery as recited in claim 5 wherein said area A can be coated with a chemical substance where such chemical substance, during high temperature, reacts with the conducting tab to increase the resistance of said area A.

8. The battery as recited in claim 7, wherein said chemical substance is one or more of the following chemicals: $MnO_2$, $Co_2O_3$, $Co_3O_4$ and $LiCO_3$, $Co(NO_3)_2$, $Ni(NO_3)_2$, $NiNO_2$, $Cr_2O_3$, $Li_2MnO_4$, $LiCrO_4$, $Li_2FeO_4$, $Fe_3O_4$, $Mn_2(SO4)_3$, $LiNoO_3$, phenol, lithium oxalate, benzoquinone, hexanedione, phthalic anhydride, oxalic anhydride, pyridic oxide, 8-hydrox-quinoline, hexamethylenetetramine, aniline, o-nitroaniline, p-nitroaniline, or one or more types of p-nitrophenol.

9. The battery as recited in claim 5, wherein said area A is covered with high temperature resistant chemical in order to minimize heat dissipation in that area.

10. The battery as recited in claim 1, wherein on said conducting tab of the positive and/or negative electrodes, there is an area B; said area B increases resistance of said conducting tab during pre-defined high temperature state.

11. The battery as recited in claim 1, wherein the active substances of said positive electrode is comprised of the complex layer-state oxides of lithium and transitional metals, their formulas are selected from the following: $Li_x Ni_{1-y}Co_yO_2$ (wherein, $0.9<=x<=1.1$, $0<=y<1.0$) and $Li_x Mn_{2-y}B_yO_2$ (among them, B is a transitional metal, $0.9<=x<=1.1$, $0<=y<=1.0$).

12. The battery as recited in claim 1 wherein the active substances of said positive electrode is selected from one of the following graphitized carbon series material: natural graphite, manufactured graphite, mesocarbon microbeads, and middle-phase-carbon fiber.

13. The battery as recited in claim 1 where in said electrolyte is a mixed solution having chain esters containing lithium-salt and circular esters containing lithium-salt; wherein lithium-salts include: lithium perchlorate, lithium hexafluorophosphorate, lithium tetrafluoroborate, lithium chloroaluminate, lithium halide, one of lithium fluorohydroxyl and oxyfluorophosphorate or their mixture; chain esters containing dimethyl-carbonate, diethyl-carbonate, ethyl methyl carbonate, ethyl propyl carbonate, diphenyl carbonate, methyl acetate, ethyl acetate, ethyl acrylate, di-methoxyethane, diethoxyethane and one of other chain organic ester containing fluorine, sulfur or unsaturated bond or their mixture; and circular esters contain ethylene carbonate, propylene carbonate, ethylidene-carbonate, γ-butyrolactone, sultone and one of other circular organic esters containing fluorine, sulfur or unsaturated bond or their mixture.

14. A stacked-type lithium-ion rechargeable battery, comprising:
   a battery core comprising a stack of a plurality of positive and negative electrode couples, where of each of said couples comprising:
      a negative electrode having a first metal plate having thereon lithium-ion active substances, wherein said first metal plate having a main body portion and a thin elongated part extending from said main body portion;
      a positive electrode having a second metal plate having thereon lithium-ion active substances, wherein said second metal plate having a main body portion and a conducting tab extending from said main body portion;
      a separator having a bag-type shape with an opening on one side;
      wherein said separator enveloping one of said positive or negative electrode; and wherein said positive electrode being stacked reversely to said negative electrode such that said elongate part of said positive electrode and said elongated part of said negative electrode are at opposite ends;
      wherein on said conducting tab of the positive and/or negative electrodes, there is an area A having a relatively larger resistance; wherein said area A of said conducting tab breaks during short-circuit state to cause no or lowered current to pass through from the electrode;
      a first clip clamping the thin elongated parts of said positive electrodes to form a positive current collector, said first clip connecting to a positive terminal;
      a second clip clamping the thin elongated parts of said negative electrodes to form a negative current collector, said second clip connecting to a negative terminal; and
      electrolyte; and
   a clamp case securing said battery core, wherein said clamp case having a box-type structure with an open upper end and an open bottom end, wherein said clamp case having two ends, wherein there is an extruding part on each of the ends, and wherein said clamp case having a side bolt for tightening said clamp case to secure said battery core.

15. The battery as recited in claim 14 wherein the cross section of said area A of the conductor tab is smaller than the cross sections of the other areas of the conductor tab.

16. The battery as recited in claim 14 wherein said area A can be coated with a chemical substance where such chemical substance, during high temperature, reacts with the conducting tab to increase the resistance of said area A.

17. The battery as recited in claim 16, wherein said chemical substance is one or more of the following chemicals: $MnO_2$, $Co_2O_3$, $Co_3O_4$ and $LiCO_3$, $Co(NO_3)_2$, $Ni(NO_3)_2$, $NiNO_2$, $Cr_2O_3$, $Li_2MnO_4$, $LiCrO_4$, $Li_2FeO_4$, $Fe_3O_4$, $Mn_2(SO4)_3$, $LiNoO_3$, phenol, lithium oxalate, benzoquinone, hexanedione, phthalic anhydride, oxalic anhydride, pyridic oxide, 8-hydrox-quinoline, hexamethylenetetramine, aniline, o-nitroaniline, p-nitroaniline, or one or more types of p-nitrophenol.

18. The battery as recited in claim 14, wherein said area A is covered with high temperature resistant chemical in order to minimize heat dissipation in that area.

19. The battery as recited in claim 14, wherein on said conducting tab of the positive and/or negative electrodes, there is an area B; said area B increases resistance of said conducting tab during pre-defined high temperature state.

20. The battery as recited in claim 14, wherein the active substances of said positive electrode is comprised of the complex layer-state oxides of lithium and transitional metals, their formulas are selected from the following: $Li_x Ni_{1-y}Co_yO_2$ (wherein, $0.9<=x<=1.1$, $0<=y<1.0$) and $Li_x Mn_{2-y}B_yO_2$ (among them, B is a transitional metal, $0.9<x<=1.1$, $0<=y<=1.0$).

21. The battery as recited in claim 14 wherein the active substances of said positive electrode is selected from one of the following graphitized carbon series material: natural graphite, manufactured graphite, mesocarbon microbeads, and middle-phase-carbon fiber.

22. The battery as recited in claim 14 where in said electrolyte is a mixed solution having chain esters containing lithium-salt and circular esters containing lithium-salt; wherein lithium-salts include: lithium perchlorate, lithium hexafluorophosphorate, lithium tetrafluoroborate, lithium chloroaluminate, lithium halide, one of lithium fluorohydroxyl and oxyfluorophosphorate or their mixture; chain esters containing dimethyl-carbonate, diethyl-carbonate, ethyl methyl carbonate, ethyl propyl carbonate, diphenyl carbonate, methyl acetate, ethyl acetate, ethyl acrylate, di-methoxyethane, diethoxyethane and one of other chain organic ester containing fluorine, sulfur or unsaturated bond or their mixture; and circular esters contain ethylene carbonate, propylene carbonate, ethylidene-carbonate, γ-butyrolactone, sultone and one of other circular organic esters containing fluorine, sulfur or unsaturated bond or their mixture.

* * * * *